United States Patent [19]

Geary

[11] Patent Number: 4,904,084
[45] Date of Patent: Feb. 27, 1990

[54] ARRANGEMENT FOR TESTING COMPLEX CONCAVE REFLECTING SURFACES FOR SHAPE DEVIATIONS

[75] Inventor: Joseph M. Geary, Las Cruces, N. Mex.

[73] Assignee: United Technologies Corporation, Hartford, Conn.

[21] Appl. No.: 289,865

[22] Filed: Dec. 27, 1988

[51] Int. Cl.$^4$ ................................................ G01B 9/02
[52] U.S. Cl. .................................................... 356/360
[58] Field of Search ................................ 356/359, 360

[56] References Cited

U.S. PATENT DOCUMENTS

| 4,089,607 | 5/1978 | Rambauske | 356/360 |
| 4,693,604 | 9/1987 | Tenjinbayashi | 356/360 X |

Primary Examiner—Davis L. Willis
Assistant Examiner—Matthew W. Koren
Attorney, Agent, or Firm—Peter R. Ruzek

[57] ABSTRACT

An arrangement for testing a concave reflecting surface of a solid body, especially a relatively complex concave reflecting surface such as that of an X-ray barrel optics mirror element, for deviations of its actual shape from its ideal shape includes a laser source and a negative cylindrical lens interposed between the laser source and the reflecting surface to be tested. The lens optically modifies the laser beam in such a manner as to propagate between the lens and the reflecting surface substantially normal to the reflecting surface and to be reflected from the latter for propagation back to and through the lens toward the laser source as a return laser beam having a wave front indicative of the actual shape of the reflecting surface and any aberrations of the lens. The arrangement further includes an interferometer that forms an interference pattern between the original and return laser beams, and a circuitry for evaluating the interference pattern. The evaluating circuitry subtracts first and second reference signals respectively representative of the ideal shape of the reflecting surface and of the influence of the lens aberrations on the interference pattern from an initial signal representative of the sensed interference pattern.

7 Claims, 1 Drawing Sheet

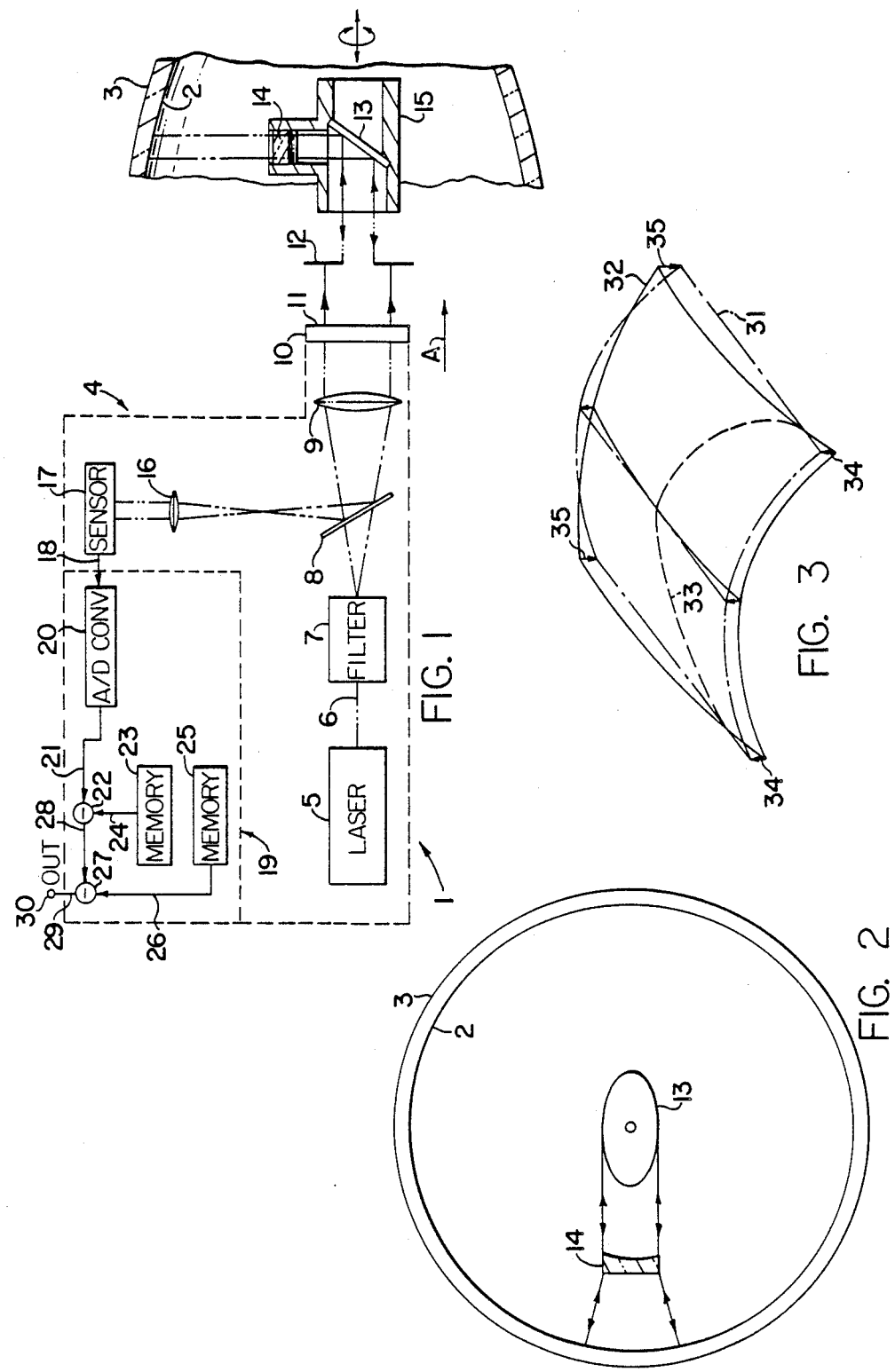

ARRANGEMENT FOR TESTING COMPLEX CONCAVE REFLECTING SURFACES FOR SHAPE DEVIATIONS

TECHNICAL FIELD

The present invention relates generally to testing concave reflecting surfaces, and more particularly to testing complex, especially grazing incidence hyperboloidal or paraboloidal, concave reflecting surfaces for deviations of their actual shapes from their ideal shapes.

BACKGROUND ART

There are already known various methods of and arrangements for testing optical reflecting surfaces for shape accuracy, among them such utilizing interferometric evaluation of a laser beam which has been reflected from the reflecting surface being tested. The heretofore known methods and arrangements become more and more complex with increasing complexity of the shape of the reflecting surface to be tested. So, for instance, it is extremely difficult to obtain reliable metrological measurements with respect to concave grazing incidence hyperboloidal or paraboloidal reflecting surfaces that are to be employed, for instance, in X-ray telescopes used in astronomy or the like. Because of their configuration, solid bodies provided with reflecting surfaces of this kind will be referred-to herein as barrel optics, but it is to be understood that the present invention is not limited to such optics.

It would be possible, at least theoretically, to test the reflecting surface of the barrel optics by directing a laser beam through a lens arrangement against the reflecting surface so as to reach this surface at the same incidence as that encountered during the normal use of the barrel optics, or at the opposite incidence. Then, the laser beam reflected from the reflecting surface could be interfered, for instance in a Fizeau-type interferometer, with the original laser beam and the resulting interferogram would then be evaluated in order to determine the extent and distribution of any deviations of the actual shape of the surface being tested from its ideal or desired shape.

Aside from alignment issues and system component errors, as well as difficulties in optically acting on the laser beam in such a manner that the wave front returning from the reflecting surface, after picking up any deviations of such surface, interferes with the original wave front in the desired manner, one important problem which severely limits the usefulness of this technique is that it can hardly be used, if at all, in the context of fabricating barrel optics and particularly their reflecting surfaces. This is so because great difficulties are encountered in localizing surface configuration errors when testing at angles of incidence that exhibit a high degree of obliqueness with respect to the surface being tested, because of the considerable and varying foreshortening occurring under these testing conditions. As a consequence, opticians or other personnel attempting to correct the configuration errors will be severely hampered in their efforts to bring the tested surface into its desired form, and there is a pronounced danger that such personnel will take erroneous corrective actions because of incorrectly evaluating or interpreting the interferogram due to the effects of the aforementioned foreshortening and other factors.

In view of these difficulties, the approach currently used most often for testing such concave barrel optics is purely mechanical in nature, that is, it employs a mechanical profilometer. This profilometer performs two kinds of measurements: one in the circumferential direction and the other in the axial direction. However, since it would be too time-consuming and cumbersome to obtain a fine grid of data sets, only a very limited number of each such measurements is taken, and interpolation is performed to obtain surface deviation values intermediate the actually obtained data in the circumferential direction and in the axial direction, respectively. This technique leaves much to be desired in terms of accuracy and reliability not only because of the disregarding of those actual deviations that occur within the grid between the measured and interpolated locations, but also because inherent properties of or environmental influences on the mechanical testing structure, be it wear, temperature changes, vibrations or other phenomena, influence the profilometer stylus point position and thus the measurement accuracy, and because the physical contact of the stylus point with the surface being tested may even damage such surface.

Accordingly, it is a general object of the present invention to avoid the disadvantages of the prior art.

More particularly, it is an object of the present invention to provide a method of testing concave reflecting surfaces, especially relatively complex ones such as those of barrel optics, for surface accuracy, which method does not possess the disadvantages of the known methods of this type.

It is yet another object of the present invention to devise a method of the above kind which would make it possible to improve the accuracy and determinativeness of the indication of any imperfections of the surface being tested.

A concomitant object of the present invention is to develop an arrangement which is particularly suited for the performance of the above method.

Still another object of the present invention is to design the arrangement of the type here under consideration in such a manner as to be able to eliminate the influence on the final testing results of any aberrations that are not those of the surface being tested.

An additional object of the present invention is so to construct the arrangement of the above type as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for testing a concave reflecting surface of a solid body, especially a relatively complex concave reflecting surface such as one having a configuration of a concave grazing incidence paraboloid or hyperboloid, which is approached during its use by radiation at incident angles considerably deviating from normal, for deviations of its actual shape from its ideal shape. This arrangement includes means for emitting a laser beam and optical means interposed between the emitting means and the reflecting surface to be tested. The optical means is operative for optically modifying the laser beam in such a manner as to propagate between the optical means and the reflecting surface along a predetermined path that is substantially normal to the reflecting surface and to be reflected from the reflecting surface for propagation substantially along the predetermined path and through the optical means back toward the emitting means as a return laser beam having a wave front indicative of the actual shape of the reflecting surface and any optical aberrations of the optical means. The arrangement further comprises means for forming an interference pattern between the original and return laser beams, and means for evaluating the interference pattern. The evaluating means of the invention includes means for generating an initial signal representative of the interference pattern, means for providing a reference signal representative of the ideal shape of the reflecting surface, means for storing an additional signal representative of the influence of the aberrations of the optical means on the interference pattern, and means for correlatedly subtracting the reference signal and the additional reference signal from the initial signal to obtain a final signal representative only of the difference between the actual and ideal shapes of the reflecting surface.

The present invention is further directed to a method of testing a concave reflecting surface of a solid body, especially a relatively complex concave reflecting surface such as that having a configuration of a concave grazing incidence paraboloid or hyperboloid, which is approached during its use by radiation at incident angles considerably deviating from normal, for deviations of its actual shape from its ideal shape, this method including the steps of emitting a laser beam, optically modifying the laser beam by at least one optical element so as to propagate toward the reflecting surface along a predetermined path that is substantially normal to the reflecting surface and to be reflected from the reflecting surface for return propagation substantially along the predetermined path and again through the optical element as a return laser beam having a wave front indicative of the actual shape of the reflecting surface and any optical aberrations of the optical element, forming an interference pattern between the laser beams, and evaluating the interference pattern. The evaluating step of the method of the present invention includes generating an initial signal representative of the interference pattern, providing a reference signal representative of the ideal shape of the reflecting surface, storing an additional signal representative of the influence of the aberrations of the optical element on the interference pattern, and correlatedly subtracting the reference signal and the additional reference signal from the initial signal to obtain a final signal representative only of the difference between the actual and ideal shapes of the reflecting surface.

BRIEF DESCRIPTION OF THE DRAWING

FIG. 1 is a top plan view of a testing arrangement of the present invention as used for testing the shape accuracy of a concave reflecting surface of a barrel optic mirror;

FIG. 2 is a somewhat simplified axial view of the arrangement of FIG. 1 taken in the direction A; and FIG. 3 is a perspective view of a portion of the reflecting surface being tested in juxtaposition with a wave front of a laser beam directed against such surface by the arrangement of FIG. 1 during its aforementioned use.

BEST MODE FOR CARRYING OUT THE INVENTION

Referring now to the drawing in detail, and first to FIG. 1 thereof, it may be seen that the reference numeral 1 has been used therein to identify a testing arrangement which has been constructed in accordance with the principles of the present invention for testing concave reflecting surfaces for deviations of their actual shapes from their ideal or desired shapes. The testing arrangement 1 is especially suitable, and is shown as being used, for testing a concave active reflecting surface 2 of an X-ray barrel optics mirror 3 in which the surface 2 has to have a high-quality paraboloid or hyperboloid configuration. The configuration and utility of the mirror 3 are well known to those active in the optical field, so that they will not be elaborated on here to any greater extent than that necessary for understanding the present invention.

The ideal shape of the reflecting surface 2 of the mirror 3 is that of a part of a surface of revolution having a parabola or hyperbola as its generatrix and a circle as its directrix; in other words, the reflecting surface 2 follows a part of a hyperbola or parabola in each axial section and a part of a circle in each cross section. In reality, the actual shape of the reflecting surface 2, while still in a substantial agreement with this ideal shape, will radially deviate therefrom to a greater or lesser degree at various locations, usually gradually. The magnitude of these radial deviations may vary either in the axial direction of the mirror 3, or in its circumferential direction, or in both of these directions at the same time, so that the reflecting surface 2 will exhibit, with respect to the desired or ideal shape thereof, depressions or protuberances which may have rather complex spatial shapes. It will be appreciated that the presence of such deviations, if permitted to remain, would result in inferior quality of the reflecting surface 2, and especially would bring about variations in the angles of incidence and reflection of radiation reaching different areas of the reflecting surface 2 during the ultimate use of the mirror 3, thus resulting in deterioration in the performance of the mirror 3 during such use. Therefore, such deviations must be removed, to the greatest extent possible, in a material-removing operation following the testing operation.

In order to be able to successfully perform this corrective material-removing operation on the reflecting surface 2 of the mirror 3, it is necessary to determine the precise location, extent and configuration of any one of the aforementioned protuberances or depressions. In accordance with the present invention, this is achieved by using an interferometric approach. This approach involves the use of an interferometer 4 which may be of any known construction. However, in the arrangement illustrated in FIGS. 1 and 2 of the drawing, the interferometer 4 is constructed as a Fizeau-type interferometer that is of a well known construction, such as that currently available on the market under the designation ZYGO Mark III phase measuring interferometer, and hence is depicted in the drawing only in a somewhat simplified fashion and will be described herein only to the extent needed for understanding the invention.

The Fizeau-type interferometer 4 includes as one of its main components a laser 5 which issues a laser beam 6 from one of its ends. After its issuance, the laser beam 6 passes through a spatial filter device 7 and is filtered thereby, and then propagates through a beam splitter 8 to a collimating lens 9 where it is collimated and directed through a reference plate 10 having a reference surface 11 toward and through an aperture mask 12 and onto a flat mirror 13 which reflects the laser beam 6 toward the reflective surface 2 of the mirror 3 in such a manner as to be directed toward the reflective surface 2 at a normal angle of incidence thereto.

On its way toward the reflective surface 2, the laser beam 6 passes through a lens 14 which is cylindrical and has a negative power, so that the laser beam 6 is dispersed thereby. Of course, since the generatrix of the surface 2 is not a circle, it is not possible to satisfy the aforementioned condition of normal incidence accurately at all axially adjacent zones of the reflecting surface by using the lens 14 of a cylindrical configuration; however, an acceptable approximation of the normal incidence can be and actually is achieved even in the axial direction. On the other hand, as may be ascertained from FIG. 2 of the drawing, the cylindrical shape of the lens 14 renders it possible to precisely satisfy this condition in the circumferential direction of the reflecting surface 14. Therefore, all references herein to normal incidence of the laser beam 6 are to be understood in the light of the above explanation to mean as close to normal incidence as possible or feasible and, in any event, considerably different from the angles of incidence of radiation at the reflecting surface 2 during the actual use of the mirror 3 in X-ray barrel optics or in similar optical apparatus.

The flat mirror 13 is mounted in the interior of a hollow shaft 15 which extends around the path of the laser beam 6, and the lens 14 is mounted on a substantially radial extension of the hollow shaft 15 in such a manner as to be traversed by the laser beam 6 after its reflection from the flat mirror 13 and before reaching the reflecting surface 2 to be tested. The cylindrical lens 14 has a focal line which is situated in front of the reflecting surface 2 and in the cylindrical lens 14 as considered in the direction of propagation of the laser beam 6 to the reflecting surface 2, so that the laser beam 6 as optically modified during its passage through the lens 14 reaches the reflecting surface 2 substantially at a normal incidence thereto at all regions of the reflecting surface 2 that are reached by the laser beam 6.

The aperture mask 12 has an aperture which delimits the area of the reflecting surface 2 that is illuminated by the optically modified laser beam 6 during any given phase of the testing operation. Moreover, the hollow shaft 15 is mounted for turning about its longitudinal axis and also for displacement along its longitudinal axis as indicated by respective arrows so as to be able to select the position of the area being illuminated by the laser beam 6 on the surface 2 being tested.

After reaching the concave reflecting surface 2 to be tested, the optically modified laser beam 6 is reflected by the reflecting surface 2 for propagation back toward and beyond the aperture mask 12 which usually eliminates some undesirable stray light from the return laser beam. The lens 14 substantially recollimates the return laser beam before reaching and being reflected by the flat mirror 13, and this recollimated laser light then propagates back to the reference surface 11 of the reference plate 10, where it is combined with a portion of the original laser beam 6 that is reflected back from the reference surface 11. The combined laser light beam then proceeds to the beam splitter 8 which reflects a portion of this combined beam to another collimating lens 16 and through the same toward a sensor 17 which senses the interference pattern resulting from the combination of the return laser light beam with the original laser light beam.

In accordance with the present invention, the sensor 17 is constructed in such a manner, for instance by being constituted by or including a TV camera, as to be able to generate an electrical signal that is representative of the fringe pattern of an interferogram sensed by the sensor 17 and thus of the wave front of the respective return laser beam. This electrical signal is then supplied through an electric conductor 18 to an evaluating circuitry 19 which either may be incorporated in the interferometer 4 or may be separate therefrom. In the depicted construction of the evaluating circuitry 19, the electrical signal appearing at the electric conductor 18 is fed to an input of an A/D converter 20 which is of any known construction and which digitizes the electrical signal received thereby from the sensor 17. The digitized electrical signal is then supplied through an electrical conductor 21 to a first subtracting device 22 of any known construction, where the contents of a first memory 23 as supplied to the first subtracting device 22 by an electrical conductor 24 is subtracted from the digitized electrical output signal of the A/D converter 20. The first memory 23 stores a first reference signal which is a digital version of an electrical signal representative of an ideal interferogram, that is, an interferogram which would be obtained at the sensor 17 if the shape of the reflecting surface 2 were ideal and if the lens 14 did not have any aberrations. Inasmuch as it is difficult if not impossible to satisfy these conditions in real life, the digital first reference signal for the respective portion of the reflecting surface 2 is advantageously calculated in advance and stored in the first memory 23.

The evaluating circuitry 19 further includes a second memory 25 for storing a digital second reference signal that is representative of an interferogram which would result from taking into account only the aberrations of the lens 14 and their influence on the wave front of original and the return laser beams. The second reference signal may be obtained by using any known technique for detecting cylindrical lens aberrations. A technique which is well suited and which is actually currently preferred for this purpose, however, is that revealed in a commonly owned U.S. Pat. No. 4,764,680, issued on Aug. 16, 1988, the disclosure of which is incorporated herein by reference to the extent needed for understanding or elucidating the present invention. In any event, regardless of the technique used to obtain this information, it will be assumed that the value of this second reference signal is known.

The second reference signal is supplied through an electrical conductor 26 to one input of a second subtracting device 27, while the output signal of the first subtracting device 22 is supplied through another electric conductor 28 to another input of the second subtracting device 27 which then subtracts the digital second reference signal from the digital output signal of the first subtracting device 22, whereupon the resulting digital signal appears at an electrical conductor 29 that is connected to the output of the second subtracting device 27 and leads to an output 30 of the evaluating circuitry 19.

The digital output signal of the second subtracting device 27 is then advantageously supplied from the output 30 to a non-illustrated computer, where it may be processed, for instance, by utilizing the known WISP fringe analysis code developed by WYKO Corp., and eventually displayed, for instance, printed out in the form of a three-dimensional map. However, the signal from the output 30 may also be supplied to a display device, such as a CRT monitor or the like, where the interferogram is then displayed for observation or recording, or directly to a recording device for recording thereat for subsequent use. A skilled optical technician or metrologist will then be able to determine from the appearance of the thus processed fringe pattern, that is, from the distribution and intensity of the fringes, the location and extent o any protuberances or depressions on the zone of the reflecting surface 2 then being tested.

It may be seen from the above explanation that the normal incidence procedure of the present invention as used for testing barrel optic mirrors involves comparison of sections of the hyperboloid or paraboloid shaped reflecting surface 2 to a best fit cylindrical wave front which is produced by the lens 14. This is diagrammatically depicted in FIG. 3 of the drawing where the reference numeral 31 has been used to identify a section of the reflecting surface 2 which is illuminated by the laser beam 6 during the particular testing operation, while the reference numeral 32 denotes a cylindrical wave front of the laser beam 6 which, for the purposes of illustration, is shown to intersect the reflecting surface section 31 at an intersection line 33 as if the wave front 32 were able to travel beyond the reflecting surface section 31. Respective up and down arrows 34 and 35 then indicate the direction and extent of deviations of the cylindrical wave front 32 from the reflecting surface section 31 at the respective corners thereof. Since the ideal shapes of the surfaces 31 and 32 and/or their forming equations are known, it is possible to calculate not only the extent of the deviations of such surfaces 31 and 32 for each pair of corresponding points located on such surfaces 31 and 32, but also the effect which such deviations will have on the shape of the wave front of the return beam that is reflected from the surface section 31 and thus on the interferogram obtained at the surface 11 of FIG. 1. The results of such calculations are then stored, as mentioned before, in the memory 23.

If the lens 14 had an ideal configuration, the wave front 32 would be perfectly cylindrical. However, this is a situation that is, for all intents and purposes, unachievable so that is to be realized that buried in the real data are the effects of the cylindrical lens 14 used in the test configuration. It is possible and contemplated by the present invention to test the lens 14, for instance by using the approach which is discussed in the aforementioned U. S. patent. The resultant interferogram is also digitized and stored in the memory 25. This lens information is then subtracted from the information resulting from the subtraction of the ideal interferogram from the actual one, to obtain the final result that conveys the information about the deviations of the actual shape of the surface section 31 being tested from the ideal or desired shape of the same section. This final information can then be used for making the necessary corrections.

Aside from rendering it possible to obtain residual optical path difference maps of each sub-aperture or section of the reflective surface 2 of the mirror 3, with their peak-valley and root mean square parameters, the technique of the present invention can also be used for splicing the thus obtained maps for the adjacent sections 32 of the surface 2 to give an overall optical path difference map of the entire surface 2. This provides a distinct advantage to the optician when polishing the surface 2 to its final configuration, since it provides an indication of the actual configuration of the surface 2 prior to the final polishing step and the extent to which corrections are to be made at the various areas of the surface 2.

The use of normal incidence testing for X-ray barrel optics mirror elements by comparing the paraboloid or hyperboloid surface 2 to a best fit cylindrical wave front 32 represents a substantial improvement over the known approaches. This technique dramatically assists in the mirror fabrication process by providing for the first time reliable data on surface configuration errors because it increases system sensitivity to deviations as compared with grazing incidence measurements.

It should be understood that the invention is not limited to the particular embodiment shown and described herein, but that various changes and modifications may be made without departing from the spirit and scope of this concept as defined by the following claims.

I claim:

1. An arrangement for testing a concave reflecting surface of a barrel-optic solid body for deviations of its actual shape from its ideal shape, comprising
    means for emitting a laser beam;
    optical means interposed between said emitting means and the reflecting surface to be tested and operative for so optically modifying said laser beam as to propagate between said optical means and the reflecting surface along a predetermined path that is substantially normal to the reflecting surface and to be reflected from the reflecting surface for propagation substantially along said predetermined path and through said optical means back toward the generating means as a return laser beam having a wave front indicative of the actual shape of the reflecting surface and any optical aberrations of said optical means;
    means for forming an interference pattern between said laser beams; and
    means for evaluating said interference pattern, including
        means for generating an initial signal representative of said interference pattern,
        means for providing a reference signal representative of the ideal shape of the reflecting surface,
        means for storing an additional signal representative of the influence of the aberrations of said optical means on the interference pattern, and
        means for correlatedly subtracting said reference signal and said additional reference signal from said initial signal to obtain a final signal representative only of the difference between the actual and ideal shapes of the reflecting surface.

2. The arrangement as defined in claim 1, wherein said optical means includes at least one lens.

3. The arrangement as defined in claim 2, wherein said lens is a negative cylindrical lens having a virtual focal line.

4. The arrangement as defined in claim 3 for use in applications in which the reflecting surface is concave at least in one direction, wherein said virtual focal line of said cylindrical lens is at least substantially normal to said one direction and is situated in front of said reflecting surface and of said lens as considered in the direction of propagation of the laser beam toward the reflecting surface for said lens to cause said laser beam to diverge during its approach of the reflecting surface and to substantially recollimate the return laser beam reflected from the reflecting surface.

5. The arrangement as defined in claim 1 for use in applications in which the reflecting surface is convex at least in one direction, wherein said optical means includes a dispersing optical element having a focal line which is at least substantially normal to said one direction and is situated in front of the reflecting surface and behind said dispersing optical element as considered in the direction of approach of the laser beam to the reflecting surface for said dispersing optical element to cause said laser beam to diverge during its approach of the reflecting surface and to substantially recollimate the return laser beam reflected from the reflecting surface.

6. A method of testing a concave reflecting surface of a barrel-optic solid body for deviations of its actual shape from its ideal shape, comprising the steps of
a laser beam;
optically modifying the laser beam by at least one negative optical element so as to propagate to the reflecting surface to be tested along a predetermined path that is substantially normal to the reflecting surface and to be reflected from the reflecting surface for propagation substantially along said predetermined path means as a return laser beam having a wave front indicative of the actual shape of the reflecting surface and any optical aberrations of said optical element;
forming an interference pattern between said laser beams; and
for evaluating said interference pattern, including
generating an initial signal representative of said interference pattern,
providing a reference signal representative of the ideal shape of the reflecting surface,
storing an additional signal representative of the influence of the aberrations of said optical element on the interference pattern, and
means for correlatedly subtracting said reference signal and said additional reference signal from said initial signal to obtain a final signal representative only of the difference between the actual and ideal shapes of the reflecting surface.

7. The method as defined in claim 6 for use in applications in which the reflecting surface is concave at least in one direction and the negative optical element has a virtual focal line, further comprising the step of so positioning the negative optical element with respect to the reflecting surface that the virtual focal line is at least substantially normal to the one direction and is situated in front of the reflecting surface as considered in the direction of propagation of the laser beam toward the reflecting surface for the optical element to cause the laser beam to diverge during its approach of the reflecting surface and to substantially recollimate the return laser beam reflected from the reflecting surface.

* * * * *